United States Patent [19]
Doniger

[11] 3,892,373
[45] July 1, 1975

[54] INTEGRATED GLIDE PATH/FLARE AUTOMATIC FLIGHT CONTROL SYSTEM
[75] Inventor: Jerry Doniger, Montvale, N.J.
[73] Assignee: The Bendix Corporation, Teterboro, N.J.
[22] Filed: Dec. 7, 1973
[21] Appl. No.: 422,948

[52] U.S. Cl........ 244/77 A; 235/150.22; 343/108 R
[51] Int. Cl............................................. B64c 13/18
[58] Field of Search............. 73/178 T; 235/150.22; 244/77 A; 318/583, 584; 340/27 R, 27 NA; 343/5 LS, 7 A, 108 R

[56] References Cited
UNITED STATES PATENTS

| | | | |
|---|---|---|---|
| 3,223,362 | 12/1965 | Doniger | 244/77 A |
| 3,327,973 | 6/1967 | Kramer et al. | 244/77 A |
| 3,447,765 | 6/1969 | Doniger et al. | 244/77 A |
| 3,652,835 | 3/1972 | Devlin et al. | 235/150.22 |
| 3,773,281 | 11/1973 | Doniger et al. | 244/77 A |
| 3,801,049 | 4/1974 | Simpson et al. | 244/77 A |

Primary Examiner—Duane A. Reger
Assistant Examiner—Stephen G. Kunin
Attorney, Agent, or Firm—Anthony F. Cuoco; S. H. Hartz

[57] ABSTRACT

A system for controlling an aircraft during integrated glide path capture and tracking and flare maneuvers when automatically landing the craft. The system eliminates the need for explicit switching to initiate the flare maneuver and the flare control channel is effectively exercised during the glide path capture and tracking maneuvers to eliminate extensive pre-land testing that would otherwise be required if the flare control channel were switched on at low critical altitudes as has previously been the case.

9 Claims, 5 Drawing Figures

DESENSITIZER 28

FLARE FUNCTION GENERATOR 37

UNSYMETRICAL LIMITER 40

INTEGRATED GLIDE PATH/FLARE AUTOMATIC FLIGHT CONTROL SYSTEM

BACKGROUND OF THE INVENTION

1. Field of the Invention

This invention relates generally to flight control systems and particularly to flight control systems for automatically controlling an aircraft when landing the craft. More particularly, this invention relates to a longitudinal flight control system which provides integrated control for performing glide path capture and tracking and flare maneuvers.

2. Description of the Prior Art

Prior to the present invention flight control systems for automatically controlling an aircraft when landing the craft required explicit switching to initiate a flare maneuver upon completion of glide path beam capture and tracking maneuvers. Further, since the flare control channel was exercised only during the flare maneuver, pre-land testing was required prior to switching on the flare channel at a predetermined low critical altitude. The device of the present invention overcomes these disadvantages in that the flare control channel is effectively exercised during the beam capture and tracking maneuvers. Moreover, the flare control signal which is generated is used as the primary glide path damping term and also for attenuating glide path beam noise. These considerations provide a simple and economical control system.

SUMMARY OF THE INVENTION

This invention contemplates a system for controlling an aircraft when landing the craft, wherein signals provided by flight condition sensors are used for generating a pitch rate command signal. The pitch rate command signal, a washed-out pitch attitude signal and a pitch rate signal are summed for providing a control signal. The pitch rate command signal is provided as a function of control systme mode logic. In this connection it is noted that modern automatic flight control systems conventionally include Instrument Landing System (ILS) or Land modes of operation which when automatically selected allow the aircraft to be controlled to the centerline of an ILS localizer (lateral) course and engage ILS glide path (longitudinal) control. The aircraft approaches the ILS glide path while the pitch control channels of the system are in compatible modes of operation such as attitude, altitude or vertical speed hold. The aircraft may therefore be initially in level flight below the glide path centerline or in descending flight above the glide path centerline. The glide path mode is engaged in accordance with predetermined logic whereby appropriate command signals are generated to force the aircraft to smoothly acquire and track the glide path centerline through the control system which may be an autopilot or flight director. As the aircraft approaches the ground the flight path angle is smoothly and accurately changed through flare channel control to reduce the rate of descent to desirable levels while providing implicit constraints on longitudinal dispersions.

The main object of this invention is to provide an automatic flight control system which provides integrated glide path capture and tracking and flare maneuvers.

Another object of this invention is to provide a system of the type described wherein the flare maneuver is achieved without explicit switching.

Another object of this invention is to provide a system of the type described wherein the same control channels are used for the beam capture and tracking maneuvers as for the flare maneuver so that the flare channel is effectively exercised prior to the flare initiation thereby precluding the necessity for extensive pre-land testing.

Another object of this invention is to provide a flare control signal and to use this signal as a primary glide path damping term and for attenuating ILS beam noise.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
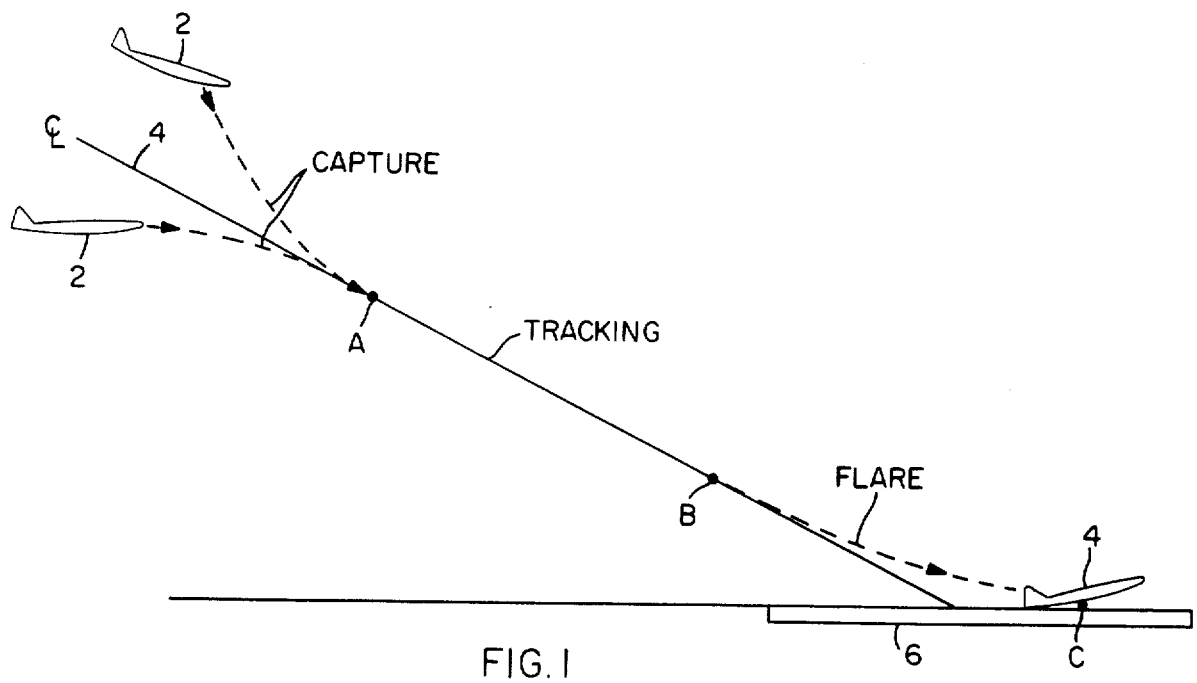
FIG. 1 is a diagrammatic representation showing typical glide path capture, tracking and flare maneuvers accommodated by the present invention.

With reference to FIG. 1, an aircraft 2 is controlled by the system of the invention to capture an ILS glide path beam centerline 4 at a point A from either level flight below the centerline or from descending flight above the centerline. Aircraft 2 tracks beam centerline 4 from point A to a point B, and at point B, which is a predetermined altitude above a runway 6, a flare maneuver is engaged to control the craft to touchdown at a point C.

Figure 2:
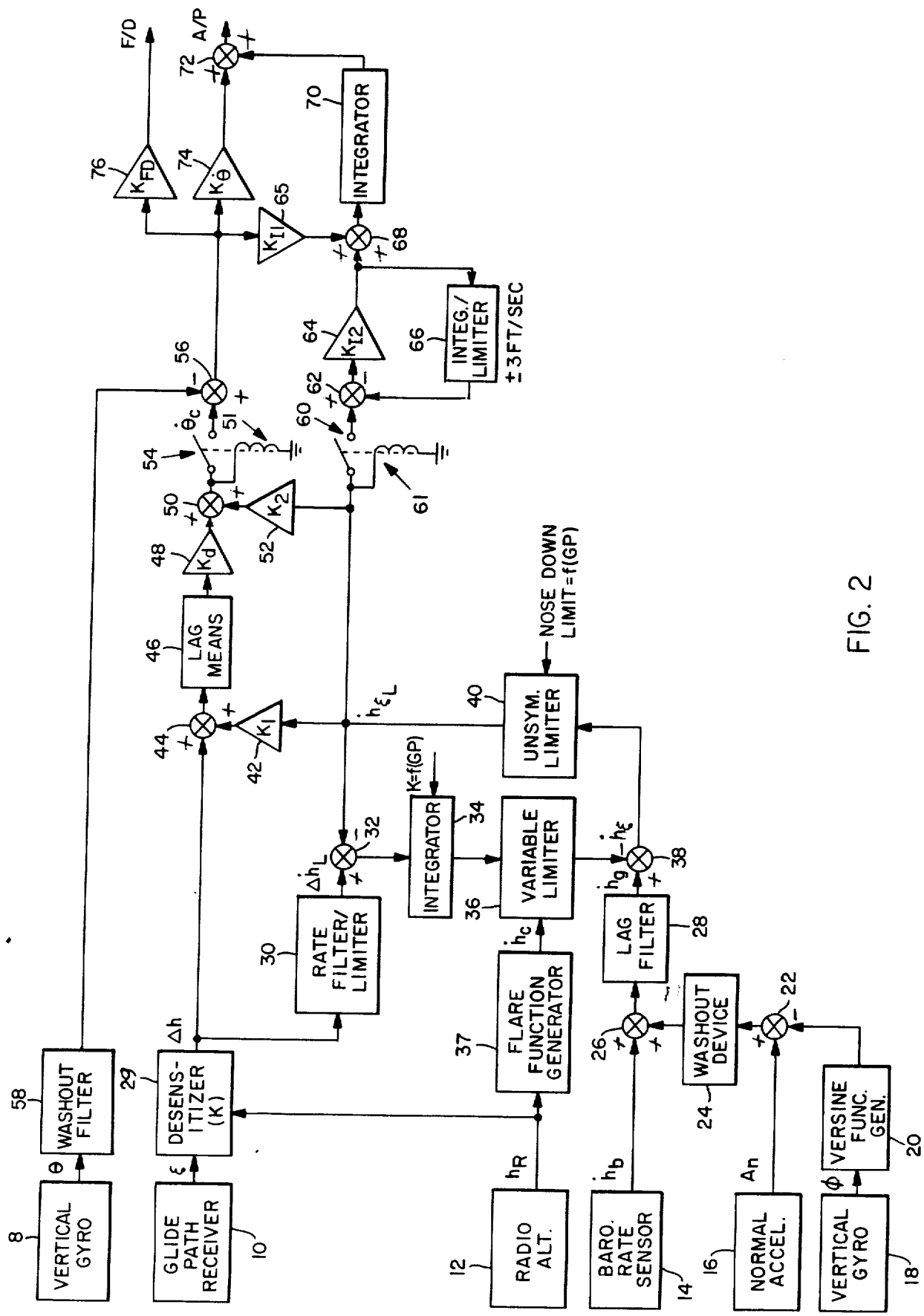
FIG. 2 is a block diagram showing a control system in accordance with the present invention.

With reference to FIG. 2, conventional flight condition sensors suitable mounted aboard aircraft 2 include a vertical gyro 8 which provides a pitch attitude signal $\theta$, a glide slope receiver 10 which provides a signal $\epsilon$ corresponding to the displacement of the aircraft from glide path beam centerline 4, a radio altimeter 12 which provides a radio altitude signal $h_r$, a barometric altitude rate sensor 14 which provides a signal $\dot{h}_b$ corresponding to barometric altitude rate of the aircraft, a normal accelerometer 16 which provides a normal acceleration signal $A_n$ and a vertical gyro 18 which provides a signal $\phi$ corresponding to the roll attitude of the aircraft.

Signal $\phi$ from vertical gyro 18 is applied to a versine function generator 20 and therefrom to a summing means 22 and summed thereby with signal $A_n$ from normal accelerometer 16. The signal from summing means 22 is applied to a washout circuit 24 and therefrom to a summing means 26 and summed thereby with signal $\dot{h}_b$ from barometric altitude rate sensor 14. The signal from summing means 26 is applied to a lag filter 28 which provides an augmented rate of descent signal $\dot{h}_a$.

Figure 3:
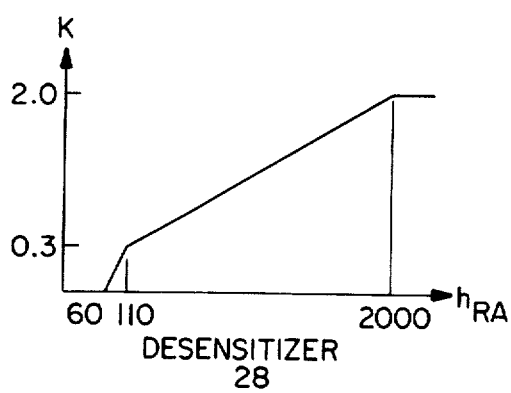
FIG. 3 is a graphical representation illustrating a function generated by a desensitizer 28 shown in the block diagram of FIG. 2.

Signal $\epsilon$ from glide path receiver 10 is applied to a desensitizer 29 having a gain K which is varied as a function of signal $h_r$ from radio altimeter 12 to provide a signal $\Delta h$ which is a linear function of the vertical deviation of the aircraft above or below the glide path centerline during the final approach of the craft below a radio altitude of, for purposes of example, 2000 feet. The gain variation of desensitizer 28 is in accordance with the graphical illustration of FIG. 3. Signal $\Delta h$ is applied to a rate filter/limiter 30 which filters and limits the signal to provide a limited rate of descent signal $\Delta \dot{h}_L$.

Signal $\Delta \dot{h}_L$ is applied through a loop including a summing means 32, an integrator 34, a variable limiter 36, a summing means 38 and an unsymmetrical limiter 40. Signal $\Delta \dot{h}_L$ is summed by summing means 32 with a signal $\dot{h}_{\epsilon L}$ from unsymmetrical limiter 40 and the summation signal is applied to integrator 34. The signal from integrator 34 is applied to variable limiter 36, the limit of which is varied as a function of signal $h_r$ from radio altimeter 12 applied through a flare function generator 37 which generates a flare command signal $\dot{h}_c$. Flare function generator 37 generates signal $\dot{h}_c$ in accordance with the graphical illustration of FIG. 4 and unsymmetral limiter 40 generates a function in accordance with the graphical representation of FIG. 5. The signal from variable limiter 36 is applied to summing means 38 and summed thereby with signal $\dot{h}_a$ to provide a rate of descent error signal $\dot{h}_\epsilon$ which in turn is limited by limiter 40 to provide signal $\dot{h}_{\epsilon L}$.

Signal $\dot{h}_{\epsilon L}$ from unsymmetrical limiter 40 is applied through an amplifier 42 having a gain $K_1$ and therefrom to a summing means 44 which sums the signal with signal $\Delta h$ from desensitizer 29. The summation signal is applied through a lag means 46 and therefrom to an amplifier 48 having a gain $K_d$. The signal from amplifier 48 is applied to a summing means 50 and summed thereby with signal $\dot{h}_{\epsilon L}$ from unsymmetrical limiter 40 applied through an amplifier 52 having a gain $K_2$.

The summation signal from summing means 50 is applied through a normally open switch 54, which is closed as will be hereinafter explained, to provide a pitch rate command signal $\dot{\theta}_c$. Signal $\dot{\theta}_c$ is applied to a summing means 56 and summed thereby with signal $\theta$ from vertical gyro 8 applied through a washout filter 58.

Signal $\dot{h}_{\epsilon L}$ from unsymmetrical limiter 40 is applied through a normally open switch 60, which is closed as will be hereinafter explained, to a summing means 62. A feedback loop including an amplifier 64 having a gain $K_{t2}$ and an integrator/limiter 66 is connected to summing means 62 and to the output of amplifier 64. The output of amplifier 64 is applied to a summing means 68 and summed thereby with the signal from summing means 56 applied through an amplifier 65 having a gain $K_{t1}$.

The signal from summing means 68 is applied to an integrator 70 and the signal from the integrator is applied to a summation means 72 and summed thereby with the signal from summing means 56 applied through an amplifier 74 having a gain $K_\theta$. The output from summing means 72 is a signal which may be applied to a conventional type autopilot servo system (A/P) for actuating the elevators of aircraft 4 to control the pitch attitude of the craft.

The signal from summing means 56 is applied to an amplifier 76 having a gain $K_{fd}$, and which amplifier provides a signal which may be applied to a conventional type flight director system (F/D).

OPERATION OF THE INVENTION

Glide path signal $\epsilon$ is processed through desensitizer 29 to provide signal $\Delta h$ which is essentially a linear function of the vertical deviation of the aircraft above or below glide path centerline 4 during the final approach below a radio altitude of, for example, 2000 feet. The gain of desensitizer 29 is reduced as a function of measured radio altitude $h_r$ to compensate for the natural conversions of the ILS glide path signal in providing the desired $\Delta h$ signal. Signal $\Delta h$ is further processed through lag means 46 prior to the formation of pitch rate command signal $\dot{\theta}_c$. Lag means 46 strongly attenuates beam noise variations that usually are present and which result primarily from reflections of the transmitted RF component of the ILS signal from interferring aircraft or terrain features.

The primary path damping term for the glide path mode of flight is rate of descent error signal $\dot{h}_\epsilon$ from summing means 38, which is limited by limiter 40 and applied through amplifier 52. This signal is also used to complement desensitized glide path signal $\Delta h$ and for this purpose the limited signal from limiter 40 is applied through amplifier 42. The output of lag means 46 is a wide band path error signal. In this connection it is noted that this complementation feature is more fully described in U.S. application Ser. No. 154,517 filed on June 18, 1971 by J. Doniger and F. Swern and assigned to The Bendix Corporation assignee of the present invention, and which application is now U.S Pat. No. 3,773,281. Further, the ratio of gain $K_d$ of amplifier 48 to gain $K_2$ of amplifier 52 is usually chosen to approximately one to ten to provide the desired capture response and path damping.

Rate of descent error signal $\dot{h}_\epsilon$ from suming means 38 is the difference between a conventional inertially complemented barometric rate of descent signal provided by barometric rate signal 14 in conjunction with accelerometer 16, rate gyro 18 and versine function generator 20, and a limited rate command signal provided by variable limiter 36. The latter signal is generated to provide the desired glide path and flare modes of operation. Thus, input signal $\dot{h}_c$ is applied to variable limiter 36 which provides the limited rate command signal. Signal $\dot{h}_c$ is derived by processing signal $h_r$ through function generator 37. The function generator provides signal $\dot{h}_c$ as a constant of approximately 15 to 20 feet per second for altitudes above, for example, 60 feet. For altitudes below 60 feet, the signal is linearly reduced so that at touchdown $h_r$ equals zero and the commanded rate of descent is at a desired nominal value. As will hereinafter become evident, function generator 37 is part of the flare mode of operation.

The signal from variable limiter 36 is modified exclusively by the signal from integrator 34. The integrator is actually in a closed loop formed by the signal path for signal $\dot{h}_\epsilon$ through the variable limiter. Prior to glide path mode engagement, as the aircraft approaches the beam centerline from either above or below the centerline as shown in FIG. 1, signal $\dot{h}_a$ from lag filter 28 is equal to the actual aircraft rate of descent and the desensitized glide path signal $\Delta h$ is being reduced at a rate proportional to the closing rate of the aircraft to the beam centerline. Signal $\Delta \dot{h}_L$ is measured at the output of rate filter 30 which also limits signals $\Delta \dot{h}_L$. Limiting is provided to prevent spurious high rate signals that are a result of ILS noise from adversely affecting succeeding signal processing. Signal $\Delta \dot{h}_L$ is the primary input to the closed loop formed by integrator 34 and variable limiter 36.

On a long term basis the response of the closed loop is such that signal $\dot{h}_\epsilon$ from summing means 38 is forced to be equal to the average value of signal $\Delta \dot{h}_L$. On a short term basis, changes in signal $\dot{h}_\epsilon$ are proportional to signal $\dot{h}_g$ from lag filter 28. The time constant of the integrator/limiter closed loop is selected to be longer than aircraft/glide path motion time constant to provide significant immunity from ILS noise.

Glide path pitch rate command signal $\dot{\theta}_c$ is allowed to drive the control system after the glide path mode is engaged. The engagement occurs when the sign of pitch rate command signal $\dot{\theta}_c$ upstream of switch 54 is consistent with the sign of beam displacement signal $\epsilon$, and at which time switch 54 is closed when the signal from summing means 50 actuates a relay 51. Prior to beam capture, when aircraft 2 is far from beam centerline 4, the filtered displacement signal portion of signal $\dot{\theta}_c$ overrides the rate signal portion $\dot{h}_\epsilon$. The rate portion is substantially constant and is proportional to the groundspeed of aircraft 2 since it is a measure of the closing rate of the aircraft to the beam centerline. The sign of the rate portion calls for nose up pitch commands if the aircraft is approaching from above and for nose down commands if the aircraft is approaching from below the centerline. The magnitude of the displacement term is reduced as the aircraft approaches the centerline and the sign of signal $\dot{\theta}_c$ changes when the rate term overrides the diminishing displacement term so that it can be properly used to control the aircraft. The glide path mode is engaged when this proper relationship between signal $\dot{\theta}_c$ and signal $\epsilon$ exists, i.e., a nose up command when the aircraft approaches the beam from below. The arrangement is such that the glide path mode will be automatically engaged for very small closing rates of any sign whenever the beam displacement is smaller than a preselected value to ensure positive engagement if the aircraft has been previously maneuvered to the centerline prior to the engagement process. Since the amplitude of signal $\dot{\theta}_c$ is smaller at engagement, the beam capture is initiated early and smoothly at a beam displacement that is a function of the closing rate of the aircraft. The capture maneuver is accomplished smoothly with very little overshoot as a result of the high ratio of beam rate gain $K_2$ of amplifier 52 to displacement gain $K_d$ of amplifier 48, and which parameters were earlier noted.

During the beam capture maneuver, the time constant of the closed loop including integrator 34, limiter 36 and unsymmetrical limiter 40 is approximately ten seconds. This allows the closed loop to properly synchronize itself to the average of signal $\Delta \dot{h}_L$ from rate filter 30. As the aircraft maneuvers to the beam centerline after capture maneuver engagement, the actual aircraft rate of descent measured by signal $\dot{h}_g$ inherently changes directly with changes in the average closing rate. Therefore, signal $\dot{h}_{\epsilon L}$ from unsymmetrical limiter 40 is a measure of the instantaneous rate of descent based on signal $\dot{h}_g$ while providing a strong filtering attenuation of ILS beam rate signal $\Delta \dot{h}_L$. Conversely very slow changes in the reference rate of signal $\dot{h}_g$ are completely washed out by the action of the closed loop which in this case follows the low frequency components of the derived rate signal that may result from changing wind and trim conditions.

The aircraft will generally be tracking the beam centerline within twenty minutes after the capture mode is engaged or at point A in FIG. 1. The gain of integrator 34 is lowered to increase its time constant to approximately 20 seconds to provide better ILS noise immunity and to prepare the system for the subsequent flare maneuver. At this point an additional signal path through amplifier 64 and integrator 70 is activated when signal $\dot{h}_{\epsilon L}$ actuates a relay 61 to close switch 60. This signal path includes separate limited output integrator 66 which provides a very fast time respone around gain $K_{12}$ of amplifier 64. This insures that no effective signal is transmitted through amplifier 64 unless the magnitude of signal $\dot{h}_\epsilon$ exceeds the limit of the integrator in the loop. This limit is set to approximately 3 feet per second and is chosen to be as small as practical so that the limit is only rarely exceeded during the final approach phase under gust and noise conditions. However, as will hereinafter become evident, signal $\dot{h}_L$ will in fact rise considerably above the limit value for a portion of the flare maneuver in some circumstances.

Unsymmetrical limiter 40 through which signal $\dot{h}_\epsilon$ is applied to provide signal $\dot{h}_{\epsilon L}$ is affected by integrator 34 20 seconds after the glide path mode is engaged. This modification involves changing the nose down limit from the symmetrical and relatively large values (about 15 feet per second) required during the capture maneuver to unsymmetrically small values that are desirable for the flare maneuver (about 3 feet per second) without compromising glide path tracking performance. The low nose down limit prevents undesirable pitching moments in that direction that might otherwise be generated by the flare channel under certain landing conditions.

Figure 4:
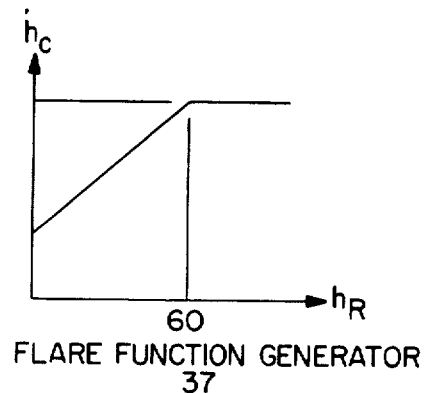
FIG. 4 is a graphical representation illustrating a function generated by a flare function generator 37 shown in the block diagram of FIG. 2.
Figure 5:
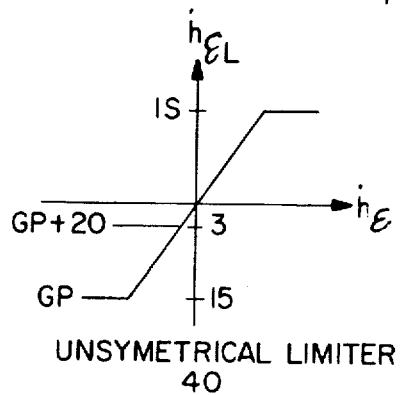
FIG. 5 is a graphical representation illustrating a function generated by an unsymmetrical limiter 40 shown in the block diagram of FIG. 2.

As the aircraft tracks the beam centerline using signal $\dot{h}_\epsilon$ as the primary path damping term, radio altitude signal $h_r$ decreases. For altitude signals corresponding to approximately 60 feet as heretofore described, output signal $\dot{h}_c$ from flare function generator 37 is constant and large enough to saturate the input stage of variable limiter 36. Thus, limiter output signal $\dot{h}_\epsilon$ is a direct function of signal $\dot{h}_L$ which in turn is equal to the average rate of the descent of the aircraft. When the aircraft descends below 60 feet, signal $\dot{h}_c$ is reduced in accordance with the prescribed shape of the function generated as shown in FIG. 4. The particular shape of the $\dot{h}_c$ function is subject to the flare requirements of the specific aircraft system being controlled. In general, signal $\dot{h}_c$ is linearly reduced from an initially high value (about 15 to 20 feet per second) above 60 feet to a low value at touchdown at about 3 feet per second. As signal $\dot{h}_c$ is reduced below the level established by average rate of descent signal $\dot{h}_L$, the output of variable limiter 36 becomes a direct function of signal $\dot{h}_c$. Since signal $\dot{h}_c$ from this point on is larger than signal $\dot{h}_L$, it will be understood that below 60 feet glide path signal $\epsilon$ is completely excluded from the signal $\dot{h}_\epsilon$ loop by operation of desensitizer 28. Thus, signal $\dot{h}_\epsilon$ which heretofore provided glide path damping is now used to drive the aircraft through amplifiers 42, 52 and 64. The signal paths thus provided generate effective displacement and integral control to force signal $\dot{h}_\epsilon$ to acceptable low levels through the flare maneuver thereby ensuring that the aircraft rate of descent designated by signal $\dot{h}_y$ tracks the desired flare function generator characteristic.

Flare path damping is provided by the washed out pitch attitude and pitch rate signals provided by the system. Although the average glide path rate of descent signal $\dot{h}_L$ is slowly reduced by the operation of the closed loop around variable limiter 36, the magnitude of signal $\dot{h}_L$ is always larger than flare command signal $\dot{h}_c$ so that the variable limiter operation during flare remains the same. This condition is ensured by the choice of the aforenoted signal $\dot{h}_\epsilon$ time constant of 20 seconds during the final approach in relation to the flare maneuver time constant which is normally 4 to 6 seconds.

During the flare maneuver, signal $\dot{h}_\epsilon$ initially rises in the nose up direction as signal $\dot{h}_c$ is reduced below the level of signal $\dot{h}_y$. $K_1$, $K_2$, $K_I$ and $K_I$ gain parameters are selected to provide desirable performance for both the flare and glide path modes of operation under normal conditions. Under some environmental circumstances the initial flare rate of descent can vary considerably from the nominal range. In particular, gusts, wind shear and ILS beam noise can result in initially higher than normal rates of descent to exist. This requires considerable aircraft elevator deflection to reduce the touchdown rate of descent to an acceptable level. The intial $\dot{h}_\epsilon$ signal can therefore rise significantly above 3 feet per second, causing the gain $K_1$ signal path to generate the required additional elevator deflection under these circumstances.

From the aforegoing description of the invention it is seen that the system disclosed does not require explicit switching to initiate the flare maneuver. All of the flare signal paths are effectively exercised during the glide path capture and tracking maneuvers. The latter consideration infers that the disclosed system does not require the extensive pre-land test features that are provided for flare systems that are switched on at low, critical altitudes such as heretofore known in the art.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for controlling an aircraft when landing the craft, comprising:
   means for providing an aircraft rate of descent signal;
   means for providing a glide path beam rate signal;
   means for limiting the glide path beam rate signal in accordance with predetermined flare mode flight parameters;
   means connected to the aircraft rate of descent signal means and to the glide path beam rate signal limiting means for combining the signals therefrom and for providing a rate of descent error signal;
   means for limiting the rate of descent error signal in accordance with predetermined glide-path mode flight parameters, said means including, means for providing a signal corresponding to the altitude of the aircraft, means for shaping the altitude signal in accordance with the flare mode flight parameters and for providing a shaped signal, means for providing a glide path beam rate signal, and feedback means connected to the beam rate signal means including means for combining the beam rate signal and the limited rate of descent error signal, means for integrating the combined signal, means for limiting the integrated signal and the limiting means connected to the shaping means, with the limit of the limiting means being varied in response to the shaped signal;
   means for providing a glide path beam displacement signal;
   means connected to the rate of descent error signal limiting means and to the beam displacement signal means, and responsive to the signals therefrom for providing a pitch rate command signal;
   means for providing a signal corresponding to the pitch attitude of the craft; and
   means connected to the pitch rate command signal means and to the pitch attitude signal means and responsive to the signals therefrom for controlling the aircraft.

2. A system as described by claim 1, wherein the means for providing an aircraft rate of descent signal includes:
   means for sensing rate of descent and for providing a corresponding signal; and
   means connected to the sensing means for inertially augmenting the signal therefrom.

3. A system as described by claim 2, wherein the means connected to the sensing means for inertially augmenting the signal therefrom includes:
   means for providing an aircraft roll attitude signal;
   means for shaping the roll attitude signal;
   means for providing an aircraft normal acceleration signal;
   means for combining the shaped roll attitude and normal acceleration signals;
   means for washing out the combined signal;
   means for combining the washed out signal and the signal from the sensign means; and
   means for filtering the last mentioned combined signal.

4. A system as described by claim 1, wherein the means for providing a glide path beam displacement signal includes:
   a sensor for sensing glide path beam displacement and for providing a corresponding signal;
   means for adjusting the gain of said signal; and
   means for varying the gain adjustment as a function of the altitude of the aircraft.

5. A system as described by claim 4, wherein the means connected to the rate of descent error signal limiting means and to the beam displacement signal means, and responsive to the signals therefrom for providing a pitch rate command signal includes:
   means for adjusting the gain of the limited rate of descent error signal by a first predetermined gain factor;
   means for combining the gain adjusted, limited rate of descent error signal with the gain adjusted beam displacement signal;
   means for filtering the combined signal;
   means for adjusting the gain of the filtered signal by a second predetermined gain factor;
   means for adjusting the gain of the limited rate of descent signal by a third predetermiend gain factor; and means for combining the gain adjusted, limited rate of descent error signal with the gain adjusted filtered signal to provide the pitch rate command signal.

6. A system as described by claim 5, including:

normally open switching, means connecting the last mentioned combining means to the aircraft controlling means, the controlling means being responsive to only the pitch attitude signal for controlling the craft; and means responsive to the pitch rate command signal when the sense of said signal is consistent with the sense of the beam displacement signal for closing the switching means, the controlling means being thereupon responsive to both the pitch rate command signal and the pitch attitude signal for controlling the craft.

7. A system as described by claim 6, including:

means connected to the switching means and to the pitch attitude signal means for combining the signals therefrom and for providing a combined signal;

means for adjusting the gain of said combined signal by a fourth predetermined gain factor; and the aircraft controlling means including flight director means connected to said gain adjusting means and responsive to the combined signal gain adjusted by the fourth predetermined gain factor for controlling the aircraft.

8. A system as described by claim 7, including:

means for adjusting the gain of the combined signal from the switching means and pitch attitude signal combining means by a fifth predetermined gain factor;

means for adjusting the gain of said combined signal by a sixth predetermined gain factor;

other normally open switching means connected to the limited rate of descent error signal means and means responsive to the error signal when said signal is at a predetermined level prior to the flare mode of flight for closing said switching means;

combining means connected to the means for adjusting the gain of the combined signal by the sixth predetermined gain factor and to the other switching means for combining the gain adjusted signal and the signal applied through the closed other switching means;

means for integrating said combined signal; and the aircraft controlling means including means for combining the integrated signal and the combined signal gain adjusted by the fifth predetermined gain factor, and autopilot means responsive to the signals from said combining means controlling the craft.

9. A system as described by claim 8, including:

feedback means connected to the output of the switching means and to the input of the means for combining the signal gain adjusted by the sixth predetermined gain factor and the signal applied through the other switching means;

said feedback means including an integrator/limiter connected to the input of said combining means and means for combining the output of the integrator/limiter with the signal applied through the closed other switching means, means for adjusting the gain of said combined signal by a seventh predetermined gain factor, and the integrator/limiter integrating and limiting said last mentioned gain adjusted signal.

* * * * *